US006876638B1

(12) United States Patent
Kuze et al.

(10) Patent No.: US 6,876,638 B1
(45) Date of Patent: Apr. 5, 2005

(54) MOBILE UNIT ADAPTED FOR PACKET COMMUNICATION, ZONE TRANSFER METHOD, AND COMPUTER READABLE RECORDING MEDIUM FOR RECORDING PROGRAM EXECUTED BY COMPUTER

(75) Inventors: Toshiyuki Kuze, Tokyo (JP); Masaaki Kusano, Tokyo (JP); Nobuo Kikuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/566,941

(22) Filed: May 8, 2000

(30) Foreign Application Priority Data

Jun. 24, 1999 (JP) ............................................. 11-178726

(51) Int. Cl.[7] .............................. H04Q 7/22; H04Q 7/38
(52) U.S. Cl. ........................ 370/331; 370/352; 370/354
(58) Field of Search ................................. 370/331, 352, 370/354, 465, 464, 395.21, 480

(56) References Cited

U.S. PATENT DOCUMENTS

| 5,457,680 A | * | 10/1995 | Kamm et al. ................ 370/332 |
| 5,774,807 A | | 6/1998 | Yazaki et al. |
| 5,790,534 A | * | 8/1998 | Kokko et al. ................ 370/335 |
| 5,884,165 A | * | 3/1999 | Uchida et al. ............ 455/426.1 |
| 2002/0022482 A1 | * | 2/2002 | Ishikawa .................... 455/434 |
| 2002/0027889 A1 | * | 3/2002 | Yun et al. .................... 370/331 |

FOREIGN PATENT DOCUMENTS

| EP | 0 589 280 A1 | 3/1994 |
| GB | 2 321 162 A | 7/1998 |

OTHER PUBLICATIONS

"Digital Cellular Telecommuncations System (Phase 2+) ; Functions Related to Mobile Station (MS) in Idle Mode and Group Receive Mode" ETSI, TS100930 V6.1.0 (Feb. 1999) (SM 03.22 Version 6.1.0 Release 1997), Feb. 28, 1999, pp 1–34.
Digital cellular telecounications (Phase 2+); Radio subsytem link control, Version 7.0, pp. 1–20 (Mar. 1999).
Personal Digial Cellular Telecommunication System RCR Standard, RCR STD–27B, pp. i–xxxi, 219, 514–515 (Apr. 1991).

* cited by examiner

Primary Examiner—Melvin Marcelo
(74) Attorney, Agent, or Firm—Birch, Stewart, Kolasch & Birch, LLP.

(57) ABSTRACT

A mobile unit comprises a surrounding level measuring unit which measures the surrounding level, a reported information acquisition unit which acquires the reported information, a control unit which controls the surrounding level measurement unit, and a zone transfer unit which transfers the zone to the one of highest level among those monitored. The control unit provides a control so as to omit the measurement of the surrounding level of the zones not adapted for packet communication based on the result of measurement by the surrounding level measurement unit or the reported information acquired by the reported information acquisition unit.

21 Claims, 14 Drawing Sheets

FIG.3

| | BIT 8 | 7 | 6 | 5 | 4 | 3 | 2 | 1 |
|---|---|---|---|---|---|---|---|---|
| OCTET 1 | \multicolumn{8}{PRESENCE OR ABSENCE OF SURROUNDING ZONES (1 TO 8)} |||||||||
| 2 | PRESENCE OR ABSENCE OF SURROUNDING ZONES (9 TO 16) | | | | | | | |
| 3 | PCH PACKET CALLED OR NOT | VIRTUAL LINE CONNE- CTABLE OR NOT | SPARE | | PRESENCE OR ABSENCE OF SURROUNDING ZONES (17 TO 20) | | | |

FIG.12
PRIOR ART

CONTENTS OF REPORTED INFORMATION (BCCH) MESSAGE

| INFORMATION ELEMENT | TYPE | INFORMATION LENGTH | REMARKS |
|---|---|---|---|
| MESSAGE TYPE | M | 1 | |
| NETWORK NO. | M | 2 | |
| RESTRICTIVE INFORMATION | M | 3 | |
| CONTROL CHANNEL STRUCTURE INFORMATION | M | 6~33 | |
| MOBILE STATION TRANSMISSION POWER DESIGNATION | M | 1 | |
| 51— STANDBY PERMISSION LEVEL | M | 1 | |
| 52— STANDBY DETERIORATION LEVEL | M | 1 | |
| NUMBER OF OVERLAPPED POSITION REGISTRATION AREAS (N) | M | 1 | |
| POSITION NO. | M | 1 | 1ST |
| ~ | ~ | ~ | ~ |
| POSITION NO. | M | 1 | NTH |
| MAX NUMBER OF REPORT CHANNELS | M | 1 | 0~M |
| NUMBER OF PERCH CHANNELS (M) FOR CURRENT ZONE SECTOR DETERMINATION | M | 1 | 0~20 |
| 53— PERCH CHANNEL NO. | O | 1 | 1ST |
| ~ | ~ | ~ | ~ |
| 54— PERCH CHANNEL NO. | O | 1 | MTH |
| POSITION REGISTRATION TIMER | M | 1 | |
| EXTENDED INFORMATION ELEMENT (K) | M | 1 | 0~127 |
| FIRST INFORMATION UNIQUE TO OPERATOR | O | 0~5 | FOR OPERATOR OPTION |
| EXTENSION STANDARD INFORMATION ELEMENT LENGTH (J) | O | 1 | 0~121 |

FIG.13
PRIOR ART

CONTENTS OF REPORTED INFORMATION (BCCH) MESSAGE (CONTINUED)

| INFORMATION ELEMENT | TYPE | INFORMATION LENGTH | REMARKS |
|---|---|---|---|
| PACKET CHANNEL STRUCTURE INFORMATION | O | 5 | EXTENSION STANDARD INFORMATION ELEMENT |
| FREQUENCY CODE (1) | O | 2 | EXTENSION STANDARD INFORMATION ELEMENT |
| SLOT NO. (1) | O | 1 | EXTENSION STANDARD INFORMATION ELEMENT |
| COLOR CODE (1) | O | 1 | EXTENSION STANDARD INFORMATION ELEMENT |
| SCRAMBLE CODE (1) | O | 1 | EXTENSION STANDARD INFORMATION ELEMENT |
| CHANNEL RESTRICTIVE INFORMATION (1) | O | 1 | EXTENSION STANDARD INFORMATION ELEMENT |
| ~ | ~ | ~ | ~ |
| FREQUENCY CODE (N) | O | 2 | EXTENSION STANDARD INFORMATION ELEMENT |
| SLOT NO. (N) | O | 1 | EXTENSION STANDARD INFORMATION ELEMENT |
| COLOR CODE (N) | O | 1 | EXTENSION STANDARD INFORMATION ELEMENT |
| SCRAMBLE CODE (N) | O | 1 | EXTENSION STANDARD INFORMATION ELEMENT |
| CHANNEL RESTRICTIVE INFORMATION (N) | O | 1 | EXTENSION STANDARD INFORMATION ELEMENT |
| TERMINAL REGISTRATION AREA CODE | O | 1 | EXTENSION STANDARD INFORMATION ELEMENT |
| NUMBER OF OVERLAPPED PACKET CALL AREA CODES | O | 1 | EXTENSION STANDARD INFORMATION ELEMENT |
| PACKET CALL AREA CODE | O | 1 | EXTENSION STANDARD INFORMATION ELEMENT |
| ~ | ~ | ~ | ~ |
| PACKET CALL AREA CODE | O | 1 | EXTENSION STANDARD INFORMATION ELEMENT |
| 55~ ZONE SERVICE INFORMATION | O | 3 | EXTENSION STANDARD INFORMATION ELEMENT |
| PACKET STANDBY PERMISSION LEVEL DIFFERENCE | O | 1 | EXTENSION STANDARD INFORMATION ELEMENT |
| PACKET USER REGISTRATION TIMER | O | 1 | EXTENSION STANDARD INFORMATION ELEMENT |
| 2ND INFORMATION UNIQUE TO OPERATOR | O | 0~K-J-6 | FOR OPERATOR OPTION |

MOBILE UNIT ADAPTED FOR PACKET COMMUNICATION, ZONE TRANSFER METHOD, AND COMPUTER READABLE RECORDING MEDIUM FOR RECORDING PROGRAM EXECUTED BY COMPUTER

FIELD OF THE INVENTION

The present invention relates to a mobile unit adapted for packet communication in a mobile communication system, a zone transfer method and a computer readable recording medium for recording a program for the computer to execute the zone transfer method. More particularly, this invention relates to a mobile unit adapted for packet communication for monitoring the surrounding zones while standing by, a zone transfer method and a computer readable recording medium for recording a program for the computer to execute the zone transfer method.

BACKGROUND OF THE INVENTION

A conventional method of zone transfer while a mobile unit is standing by is the one specified in "Personal Digital Cellular Telecommunication System RCR Standard", RCR STD-27G published by ARIB (Association of Radio Wave Industry Business). In STD-27G, information for notifying about the current zone (hereinafter, reported information) is transmitted from the network to a mobile unit. FIG. 12 and FIG. 13 are diagrams showing the contents of the message of the conventional reported information specified in STD-27G.

The reported information contains a standby permission level (indicated by reference numeral 51) indicating the receiving level in the range of each radio zone/sector where a mobile station (mobile unit) can stand by, a standby deterioration level (indicated by reference numeral 52) indicating the receiving level at which it is determined that the mobile station standing by in each radio zone/sector has been deteriorated from the standby state, the perch channel number (indicated by reference numerals 53 and 54) providing the number of perch channel where the level is monitored in the determination of the current zone/sector, and the zone service information (indicated by reference numeral 55) for notifying the mobile station of the service condition in the current zone and the surrounding zones.

The operation of the conventional mobile unit will be explained here. FIG. 14 is a diagram for explaining the operation of measuring the surrounding level performed by the conventional mobile unit. When measuring the surrounding level, the mobile unit measures the receiving level a plurality of times (indicated by reference numeral 58) using all the surrounding perch channels notified in the reported information in the vacant slots associated with the reported information receiving slots (indicated by reference numeral 56) and the PCH receiving slot (indicated by reference numeral 57) of the local station, obtains an average of the measured values, and makes this average as a measurement value of the surrounding level.

FIG. 15 is a flowchart showing the sequence of the zone transfer operation performed by the conventional mobile unit. When performing the zone transfer operation, the mobile unit first measures the surrounding level using all the surrounding perch channels notified in the reported information (step S51) Then, the receiving level Lo of the local station slot is compared with the standby deterioration level Lth notified in the reported information (step S52). If the receiving level Lo of the local station slot is equal to or greater less than the standby deterioration level Lth, i.e. when the electric field is strong, the maximum max(Li) of the receiving level of the surrounding zone is compared with Lo+ΔL (step S53). ΔL in this equation can be determined as follows:

$$\Delta L = (Ltn - Lth)$$

If the maximum max(Li) of the receiving level of the surrounding zone is greater than Lo+ΔL in step S53, the standby channel select mode prevails, and the zone transfers to the surrounding perch channel of maximum level (step S54) If the maximum max(Li) of the receiving level of the surrounding zone is equal to or less than Lo+ΔL, on the other hand, the process in step S51 is carried out. If the receiving level Lo of the local station slot is less than the standby deterioration level Lth in step S52, i.e. when the electric field is weak, then the maximum max(Li) of the receiving level of the surrounding zone is compared with the standby permission level Ltn (step S55). If the maximum max(Li) is greater than Ltn, the process in step S54 is carried out, while if the maximum max(Li) is equal to or less than Ltn, the perch channel is scanned (step S56).

The conventional mobile unit adapted for packet communication also operates substantially in the same manner as the conventional mobile unit already above described. At the time of zone transfer in standby mode, however, the mobile unit transfers always to a zone adapted for packet communication where the packet communication service is available. Specifically, in step S54 of FIG. 15, the mobile unit transfers to the surrounding perch channel zone of maximum level adapted for packet communication.

SUMMARY OF THE INVENTION

It is an object of this invention to provide a mobile unit adapted for packet communication for reducing the power consumption and reducing the wasteful use of the communication bands by reducing the wasteful zone transfer, a zone transfer method and a computer readable recording medium for recording a program for the computer to execute the zone transfer method.

In order to solve the problem and achieve the object described above, in a mobile unit according to one aspect of the present invention, the zones adapted for packet communication which provide a packet communication service are only monitored, and the zones not adapted for packet communication where the packet communication service is not available are not monitored. As a result, the number of the surrounding perch channels for level measurement is reduced in the area where the zones adapted for packet communication coexists with the zones not adapted for packet communication or where there are multiplicity of zones adapted for packet communication, while at the same time avoiding the zone transfer chain.

In a mobile unit adapted for packet communication according to another aspect of the present invention, a measurement unit is provided for measuring the surrounding level, and a control unit is provided for controlling the measurement unit and eliminating the measurement of the level of the surrounding zones not adapted for packet communication based on the result of measurement by the measurement unit. Thus, the measurement unit measures the surrounding level, and the control unit controls the measurement unit and eliminates the measurement of the level of the surrounding zones not adapted for packet communication based on the result of measurement by the measurement unit. As a result, in the area where zones adapted for packet communication coexists with zones not adapted for packet communication or where there are multiplicity of zones adapted for packet communication, the number of the surrounding perch channels for level measurement can be reduced, while at the same time avoiding the zone transfer chain.

Further, when the measurement result by the measuring unit shows that the number of the surrounding zones adapted for packet communication higher than a specified level is larger than a preset number, the control unit controls the measurement unit and eliminates the measurement of the level of the surrounding zones not adapted for packet communication while measuring the surrounding level of only the zones adapted for packet communication. As a result, in the case where the number of the surrounding zones adapted for packet communication equal to or greater than a specified level is equal to or greater than an arbitrary predetermined value, the number of surrounding perch channels for level measurement can be reduced in the area where there coexist zones adapted for packet communication and zones not adapted for packet communication or where there are a multiplicity of zones adapted for packet communication, while at the same time avoiding the zone transfer chain.

Further, a zone transfer unit is provided for transferring to a surrounding zone of the highest level among the zones monitored. Where the result of the measurement by the measurement unit shows that the number of the surrounding zones adapted for packet communication higher than a specified level is smaller than a preset number, the control unit controls the measurement unit in such a manner as to measure the level of the surrounding zones including the zones not adapted for packet communication. Thus, the number of surrounding zones selectable at the time of zone transfer is increased and the transfer unit transfers the mobile unit to the surrounding zone highest in level among the zones monitored. As a result, in the case where the number of surrounding zones adapted for packet communication equal to or greater than a specified level is smaller than an arbitrary predetermined number, the zone transfer during the voice communication due to the transmission and receiving of the voice is reduced.

In a mobile unit adapted for packet communication according to still another aspect of the present invention, a measurement unit is provided for measuring the surrounding level, an acquisition unit is provided for acquiring the reported information, and a control unit is provided for controlling the measurement unit and eliminating the measurement of the level of the surrounding zones not adapted for packet communication based on the reported information acquired by the acquisition unit. Thus, the measurement unit measures the surrounding level, the acquisition unit acquires the reported information, and the control unit controls the measurement unit to eliminate the measurement of the level of the surrounding zones not adapted for packet communication based on the reported information acquired by the acquisition unit. As a result, the number of surrounding perch channels for level measurement can be reduced in the area where there coexist zones adapted for packet communication and zones not adapted for packet communication or where there are a multiplicity of zones adapted for packet communication, while at the same time avoiding the zone transfer chain.

Further, when the number of the perch channels adapted for packet communication notified in the reported information is larger than a preset number, the control unit controls the measurement unit in such a manner as to omit the measurement of the level of the surrounding zones not adapted for packet communication and measure only the surrounding level of the zones adapted for packet communication. As a result, in the case where the number of surrounding zones adapted for packet communication notified in the reported information is equal to or greater than an arbitrary predetermined number, the number of surrounding perch channels for level measurement can be reduced in the area where there coexist zones adapted for packet communication and zones not adapted for packet communication or where there are a multiplicity of zones adapted for packet communication, while at the same time avoiding the zone transfer chain.

Further, a zone transfer unit is provided for transferring to a surrounding zone highest in level among the zones monitored, and when the number of the perch channels adapted for packet communication notified in the reported information is smaller than a preset number, the control unit controls the measurement unit in such a manner as to measure the level of the surrounding zones including those not adapted for packet communication. As a result, in the case where the number of perch channels adapted for packet communication notified in the reported information is smaller than an arbitrary predetermined number, the zone transfer during the voice communication due to the voice transmission and receiving is reduced.

In a zone transfer method used for mobile communication according to still another aspect of the present invention, only the zones adapted for packet communication are monitored. In other words, the zones not adapted for packet communication where the packet communication service is not offered are not monitored. As a result, in the area where zones adapted for packet communication coexist with zones not adapted for packet communication and the area where a multiplicity of zones adapted for packet communication exist, the number of perch channels for level measurement can be reduced while at the same time avoiding the zone transfer chain.

In a zone transfer method according to still another aspect of the present invention a surrounding level is measured; and it is selected whether the measurement of the surrounding zones not adapted for packet communication is to be eliminated or not, based on the result of measurement in the measurement step. Thus, the surrounding level is measured, and based on the result of measurement, the measurement of the level of the surrounding zones not adapted for packet communication is omitted. As a result, in the area where zones adapted for packet communication coexist with zones not adapted for packet communication and the area where a multiplicity of zones adapted for packet communication exist, the number of perch channels for level measurement can be reduced while at the same time avoiding the zone transfer chain.

Further, when the measurement result shows that the number of the surrounding zones adapted for packet communication equal to or greater than a specified level is larger than a preset number, in the selection step the measurement only of the surrounding zones adapted for packet communication is selected while eliminating the measurement of the surrounding zones not adapted for packet communication. Thus, when the number of surrounding zones adapted for packet communication equal to or greater than a specified level is larger than a preset number, the measurement of the level of the surrounding zones not adapted for packet communication is omitted, and the level of only the surrounding zones adapted for packet communication is measured. As a result, in the case where the number of sur rounding zones adapted for packet communication equal to or greater than the specified level is equal to or greater than an arbitrary predetermined number, the number of perch channels for level measurement can be reduced in the area where zones adapted for packet communication coexist with zones not adapted for packet communication and the area where a multiplicity of zones adapted for packet communication exist, while at the same time avoiding the zone transfer chain.

Further, a step of transferring to a surrounding zone highest in level among the zones monitored is provided, and when the measurement result shows that the number of the surrounding zones adapted for packet communication equal to or greater than a specified level is smaller than a preset number, in the selection step the measurement of the level of the surrounding zones including those not adapted for packet communication is selected. Thus, when the number of surrounding zones adapted for packet communication equal to or greater than a specified level is smaller than a preset number, the surrounding level including zones not adapted for packet communication is measured, and the zone is transferred to the one of highest level among those monitored. As a result, in the case where the number of surrounding zones adapted for packet communication equal to or greater than the specified level is smaller than an arbitrary predetermined number, the zone transfer during the voice communication due to the voice transmission or receiving is reduced.

In a zone transfer method according to still another aspect of the present invention, surrounding level is measured, reported information is acquired and the measurement of the level of the surrounding zones not adapted for packet communication is omitted based on the acquired reported information. As a result, the number of surrounding perch channels for level measurement can be reduced in the area where zones adapted for packet communication coexist with zones not adapted for packet communication and the area where a multiplicity of zones adapted for packet communication exist, while at the same time avoiding the zone transfer chain.

Further, when the number of the perch channels adapted for packet communication notified in the reported information is larger than a preset number, in the selection step the measurement of the level of only the surrounding zones adapted for packet communication is selected while eliminating the measurement of the level of the surrounding zones not adapted for packet communication. Thus, when the number of surrounding zones adapted for packet communication notified in the reported information is larger than a preset number, the level measurement of the surrounding zones not adapted for packet communication is omitted, and the surrounding level of only the zones adapted for packet communication is measured. As a result, in the case where the number of surrounding zones adapted for packet communication notified in the reported information is equal to or greater than an arbitrary predetermined number, the number of surrounding perch channels for level measurement can be reduced in the area where zones adapted for packet communication coexist with zones not adapted for packet communication and the area where a multiplicity of zones adapted for packet communication exist, while at the same time avoiding the zone transfer chain.

Further, a step of transferring to a surrounding zone highest in level among the zones monitored, and when the number of the perch channels adapted for packet communication notified in the reported information is smaller than a preset number, in the selection step measurement of the level of the surrounding zones including the zones not adapted for packet communication is selected. Thus, when the number of perch channels adapted for packet communication notified in the reported information is smaller than a preset number, the surrounding level including the zone not adapted for packet communication is measured and the zone is transferred to a surrounding zone highest in level among those monitored. As a result, in the case where the number of the perch channels adapted for packet communication notified in the reported information is smaller than an arbitrary predetermined number, the zone transfer during the voice communication due to the transmission or receiving of the voice is reduced.

A computer readable recording medium according to still another aspect of the present invention records therein a computer program for the computer to execute the method according to the present invention described above. Therefore, the aforementioned method according to the present invention can be efficiently and easily be executed using a computer.

Other objects and features of this invention will become apparent from the following description with reference to the accompanying drawings.

BRIEF DESCRIPTION OF THE DRAWINGS

FIG. 3 is a diagram for explaining the contents of the zone service information according to the present embodiment.

FIG. 12 is a diagram showing the contents of the message of the reported information specified in STD-27G in the prior art.

FIG. 13 is an another diagram showing the contents of the message of the reported information specified in STD-27G in the prior art.

DESCRIPTION OF THE PREFERRED EMBODIMENTS

A mobile unit adapted for packet communication, a zone transfer method and a computer readable recording medium for recording a program for the computer to execute the method according to the present invention will be explained below in detail with reference to the drawings. However, this invention is not limited to these embodiments.

Figure 1:
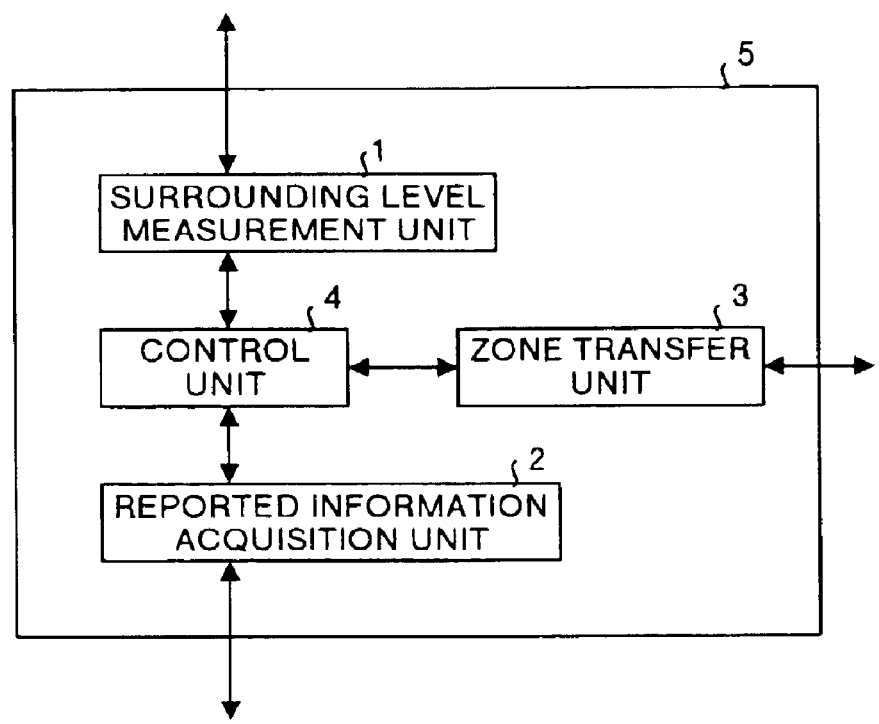
FIG. 1 is a block diagram showing a general configuration of a mobile unit adapted for packet communication according to an embodiment of the present invention.

FIG. 1 is a block diagram showing a general configuration of a mobile unit adapted for packet communication according to an embodiment of the present invention. A mobile unit 5 adapted for packet communication according to this embodiment comprises a surrounding level measurement unit 1 which detects the receiving level of the surrounding zones (measuring the surrounding zones), a reported information acquisition unit 2 which acquires the reported information from a network, a zone transfer unit 3 which transfers, if required, the zone to a surrounding one highest in level among those monitored, and a control unit 4 which controls all the sections of the mobile unit 5 adapted for packet communication.

The control unit 4 receives the reported information from the reported information acquisition unit 2. The control unit 4 controls the surrounding level measurement unit 1 so as to measure the surrounding level not of the surrounding zones of all the perch channels notified in the reported information but select only the surrounding perch channels adapted for packet communication by use of the zone service information described later and notified in the reported information and measure the surrounding level in only the selected perch channels.

As an alternative, in the case where the number of perch channels adapted for packet communication notified in the reported information is larger than a preset (arbitrary) number, or in the case where the result of measurement of the surrounding level (the monitoring of the surrounding level) shows that the number of perch channels adapted for packet communication equal to or greater than a specified level is larger than a preset (arbitrary) number, the surrounding level only of the perch channels adapted for packet communication is measured. Alternatively, in the case where the number of zones adapted for packet communication notified in the reported information is smaller than a preset (arbitrary) number, or in the case where the result of measurement of the surrounding level shows that the number of surrounding perch channels equal to or greater than a specified level is smaller than a preset (arbitrary) number, on the other hand, the surrounding level including the zones not adapted for packet communication is measured.

Figure 2:
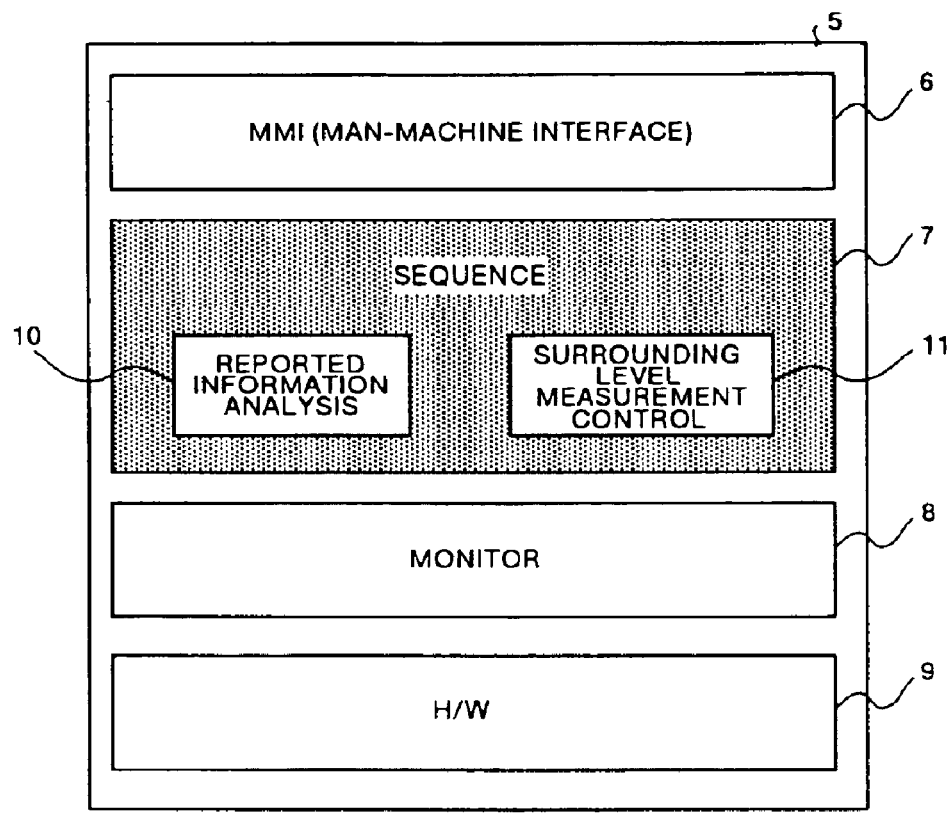
FIG. 2 is a diagram for explaining a software structure of a mobile unit adapted for packet communication according to the present embodiment.

FIG. 2 is a diagram for explaining the software structure of the mobile unit 5 adapted for packet communication according to this embodiment. The mobile unit 5 adapted for packet communication comprises a man-machine interface (MMI) 6, a sequence 7 for controlling the calls to and from the base station, radio management and movement management, a hardware (H/W) unit 9, and a monitor 8 that controls the hardware unit 9. The sequence 7 includes a reported information analysis 10 and a surrounding level measurement control 11 which are the essential parts of the present invention.

FIG. 3 is a diagram for explaining the contents of the zone service information (reference numeral 55 in the drawing) included in the reported information shown in FIGS. 12 and 13. The zone service information includes the information on the presence or absence of a surrounding zone, the information on the presence or absence of a PCH packet call and the information on the connectability of a virtual line. Each bit of the surrounding zone presence-absence information corresponds one-to-one to the surrounding perch channel number to be monitored shown at 53 and 54 in FIG. 12, so that the bit corresponding to the perch channel of the zone adapted for packet communication is set to "1" and the bit corresponding to the perch channel of the zone not adapted for packet communication is set to "0". The reported information analysis 10 analyzes the reported information and specify a surrounding zone adapted for packet communication using the zone service information and the perch channel number to be monitored.

Figure 4:
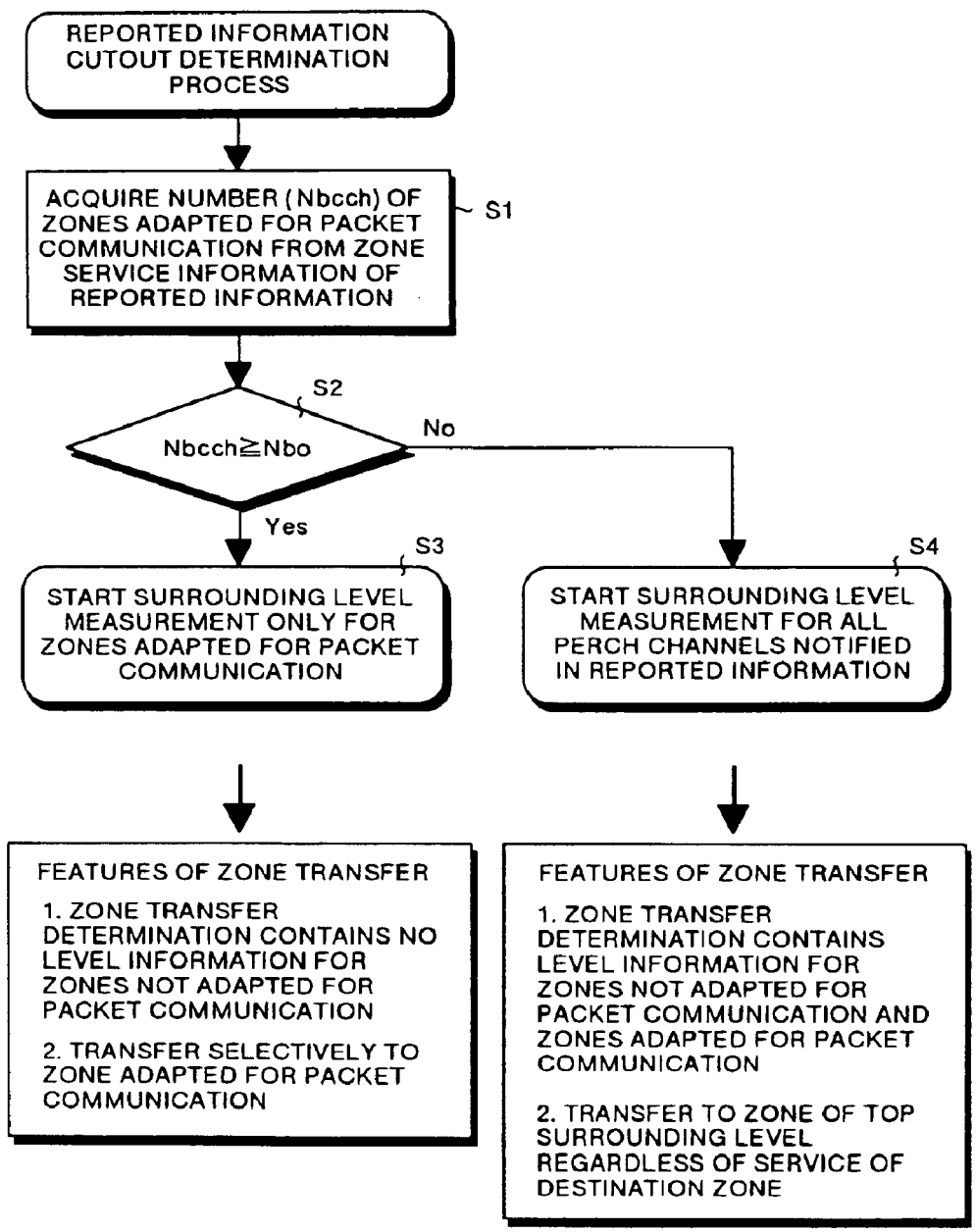
FIG. 4 is a flowchart showing the sequence of the reported information cutout determination process according to the present embodiment.

With the configuration described above, the operation of the present embodiment will be explained with reference to FIG. 4 to FIG. 11. First, an explanation will be given of the reported information cutout determination process of analyzing the reported information and starting the measurement of the surrounding level. FIG. 4 is a flowchart showing the sequence of the reported information cutout determination process according to this embodiment. In the reported information cutout determination process, the mobile unit 5 adapted for packet communication first acquires the number (Nbcch) of packets adapted for communication in the surrounding zones from the zone service information of the reported information (step S1).

An arbitrary number preset by the user or the like, or an arbitrary number Nbo of 0 to 20 for the PDC (the cellular digital portable telephone system of Personal Digital Cellular, Japan), for example, is compared with the number Nbcch of the zones adapted for packet communication (step S2). If Nbcch is equal to or greater than Nbo, it is determined that the local unit is located in an area adapted for packet communication where there are a multiplicity of zones adapted for packet communication, or in an area where zones adapted for packet communication coexist with zones not adapted for packet communication, the level of the zones not adapted for packet communication is not measured, and the measurement of the surrounding level is started only for the zones adapted for packet communication (step S3). As a result, the zone transfer determination contains no level information of the zones not adapted for packet communication, and the zone is transferred, if required, selectively to the one adapted for packet communication.

On the other hand, if Nbcch is less than Nbo in step S2, it is determined that the local unit is located in the boundary between an area adapted for packet communication and an area not adapted for packet communication or in an area adapted not for packet communication and the measurement of the surrounding level is started in all the perch channels notified in the reported information (step S4). As a result, the zone transfer determination at the time of zone transfer contains the level information of the zones not adapted for packet communication and the zones adapted for packet communication, and the zone is transferred to the one of highest receiving level among the surrounding ones regardless of the contents of the service at the destination zone.

Figure 5:
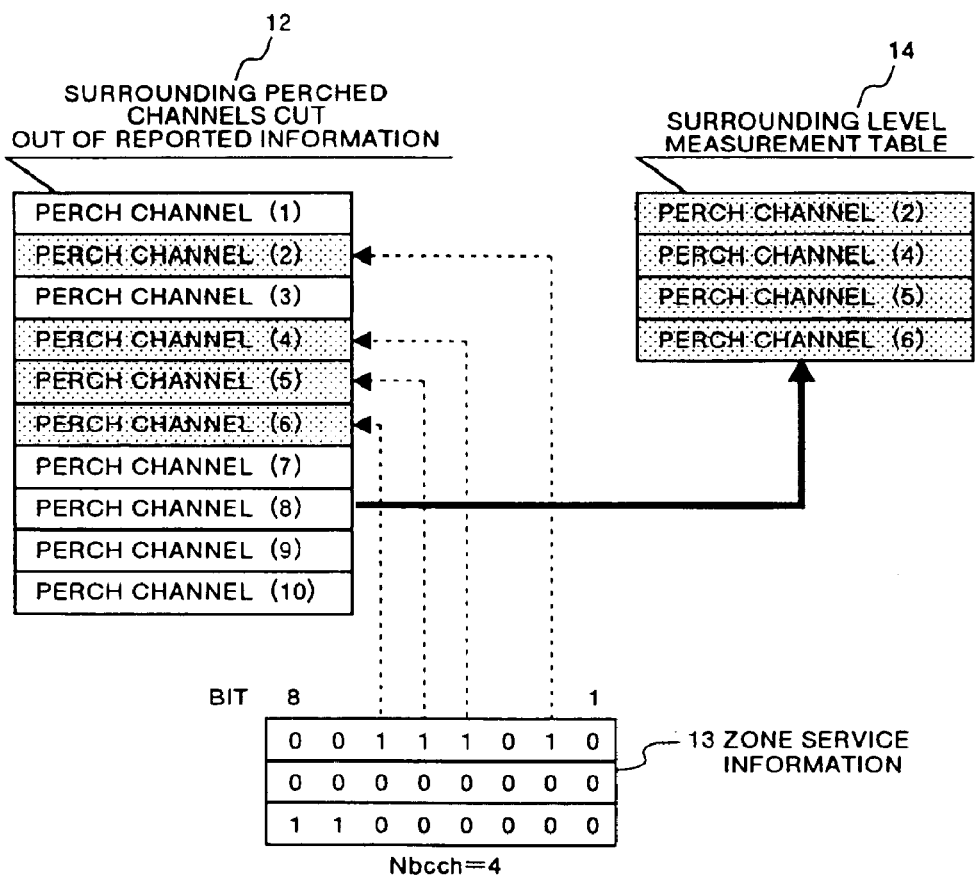
FIG. 5 is a diagram for explaining the reported information cutout determination process according to the present embodiment.

FIG. 5 is a diagram for explaining the operation for the reported information cutout process when Nbcch is equal to or greater than Nbo, and illustrates the case in which the number of surrounding perch channels to be monitored is 10, Nbcch is 4 and Nbo is 2. The mobile unit 5 adapted for packet communication cuts out the surrounding perch channel 12 from the reported information and, because 4(Nbcch) $\geq$2(Nbo), determines with reference to the zone service information 13 that the local unit is located in an area adapted for packet communication or in an area where zones adapted for packet communication coexist with zones not adapted for packet communication. Thus, the mobile unit 5 generates a surrounding level measurement table 14 by extracting only the perch channels adapted for packet communication, and starts measuring the surrounding level using the surrounding level measurement table 14 thus generated.

As a result, in an area adapted for packet communication or an in area where zones adapted for packet communication coexist with zones not adapted for packet communication, the number of the perch channels for which the surrounding level is to be measured is reduced thereby to suppress the power consumption. Further, in view of the fact that the zone is transferred to the one adapted for packet communication by measuring the surrounding level only for an area adapted for packet communication, the zone transfer chain can be avoided.

Figure 6:
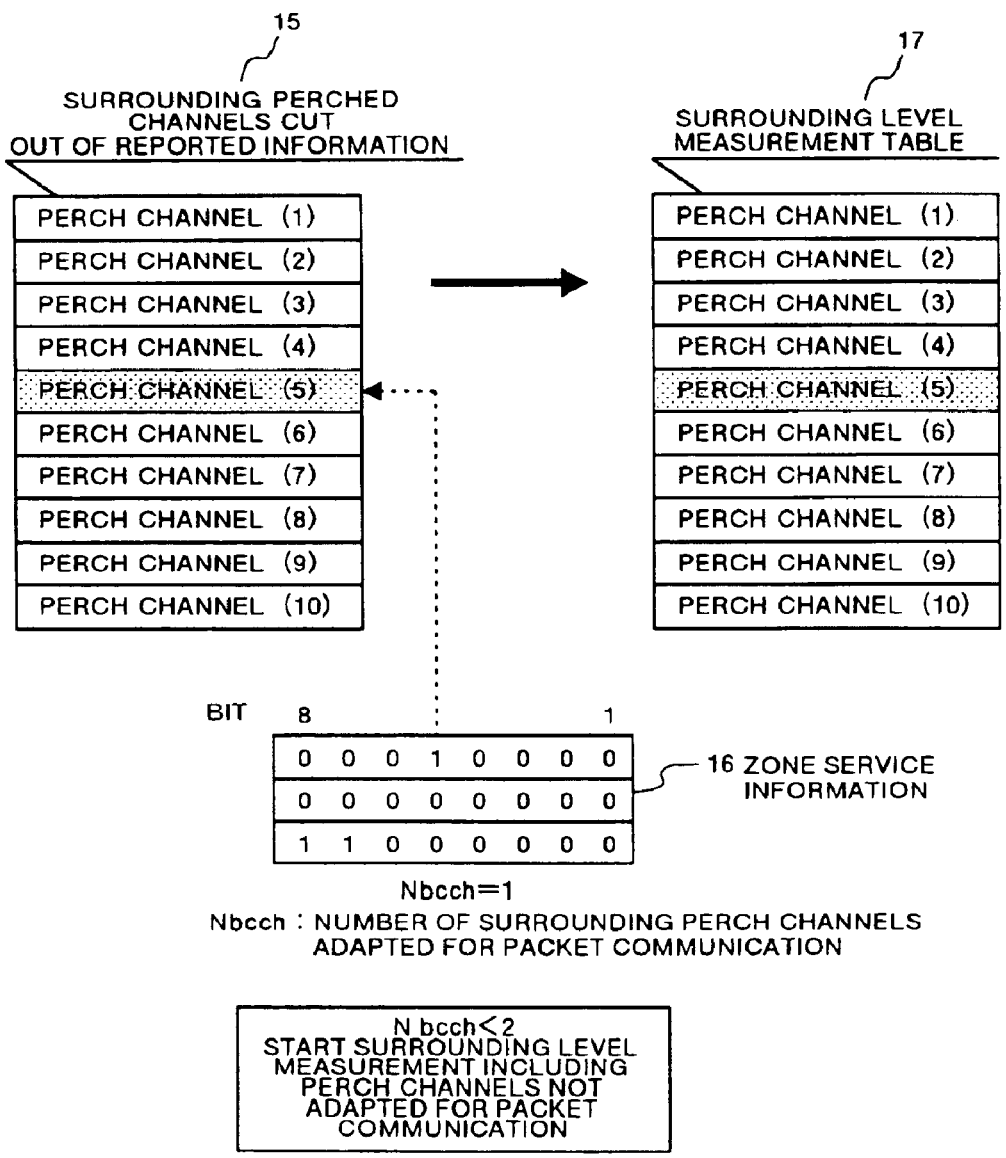
FIG. 6 is an another diagram for explaining the reported information cutout determination process according to the present embodiment.

FIG. 6 is a diagram for explaining the operation for the reported information cutout determination process in the case where Nbcch is less than Nbo, and illustrates the case in which the number of surrounding perch channels to be monitored is 10, Nbcch is 1 and Nbo is 2. The mobile unit 5 adapted for packet communication cuts out the surrounding perch channel 15 from the reported information, and because 1(Nbcch)<2(Nbo) in this case, determines with reference to the zone service information 16 that the local unit is located in the boundary between an area adapted for packet communication and an area not adapted for packet communication or in an area not adapted for packet communication, generates a surrounding level measurement table 17 including the perch channels not adapted for picket communication, and starts measuring the surrounding level using the surrounding level measurement table 17 thus generated.

As a result, the probability of zone transfer in the boundary between an area adapted for packet communication and an area not adapted for packet communication or in an area not adapted for packet communication without transferring to a perch channel scan can be increased thereby to suppress the power consumption. Further, the probability of zone transfer by detecting a strong electric field immediately after a zone transfer at the time of transfer to voice communication can be reduced.

Figure 7:
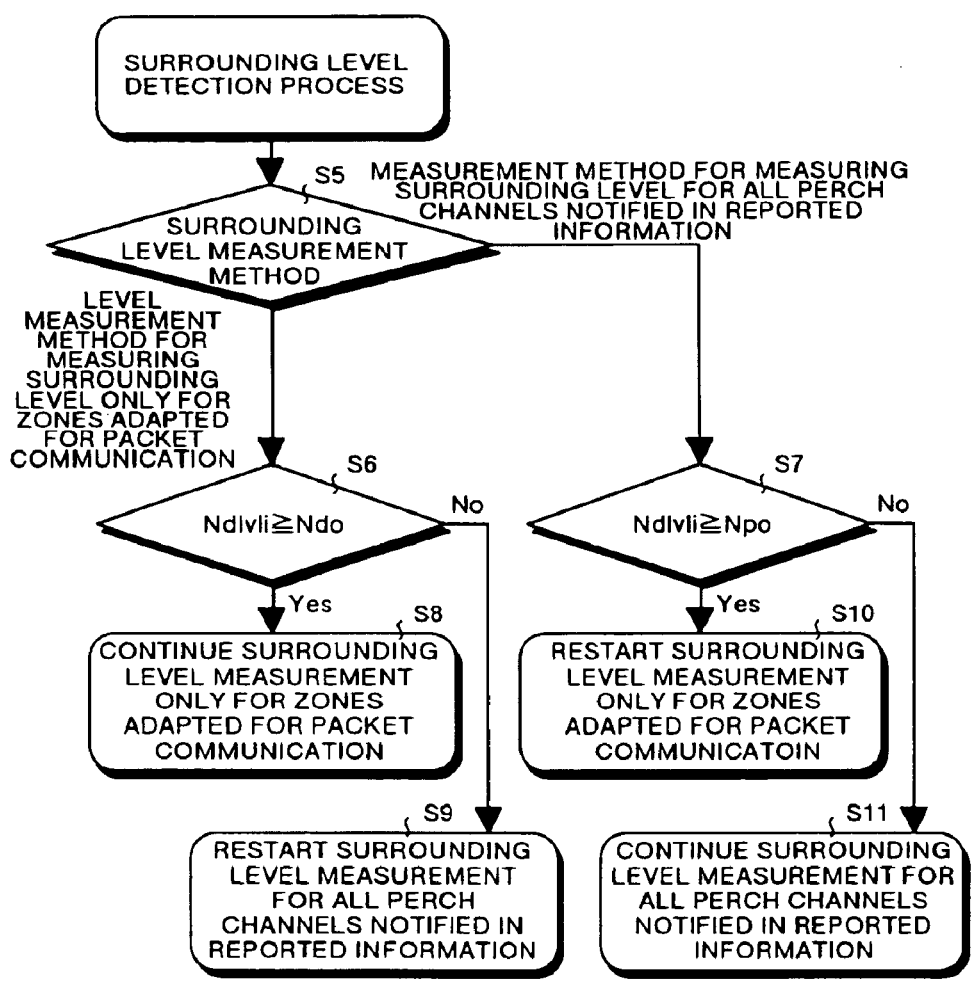
FIG. 7 is a flowchart showing the sequence of the surrounding level detection process according to the present embodiment.

Now, an explanation will be given of the surrounding level detection process constituting a process performed at the time of detecting a surrounding level (after complete measurement of the surrounding level). FIG. 7 is a flowchart showing the flow of the surrounding level detection process according to this embodiment. In the surrounding level detection process, the mobile unit 5 adapted for packet communication first determines whether the measurement method for measuring the surrounding level for all the perch channels notified in the reported information or the level measurement method for measuring the surrounding level only for the zones adapted for packet communication is selected (step S5).

When the level measurement method for measuring the surrounding level only for the zones adapted for packet communication is selected, the number Ndlvli of the perch channels adapted for packet communication for which the receiving level of equal to or greater than a specified level is measured is compared with an arbitrary number Ndo (0 to 20) preset by the user or the like (step S6). In this case, the specified level is the sum (Lo+ΔL) of the receiving level Lo of the local station slot and ΔL, where ΔL is the difference (Ltn−Lth) between the standby deterioration level Lth and the standby permission level Ltn.

If Ndlvli≧Ndo, it is determined that the local unit is located in an area adapted for packet communication or in an area where zones adapted for packet communication coexist with zones not adapted for packet communication and the measurement of the surrounding level is continued only for the zones adapted for packet communication (step S8), and if Ndlvli<Ndo, it is determined that the local unit is located at a boundary between an area adapted for packet communication and an area not adapted for packet communication or in an area not adapted for packet communication, and the measurement of the surrounding level for all the perch channels notified in the reported information is started (step S9).

In the case where the measurement method is selected for measuring the surrounding level for all the perch channels notified in the reported information, on the other hand, the number Ndlvli of the perch channels adapted for packet communication for which the receiving level of equal to or greater than a specified level is measured is compared with an arbitrary number Npo (0 to 20) preset by the user or the like (step S7). If Ndlvli≧Npo, it is determined that the local unit is located in an area adapted for packet communication or an area where zones adapted for packet communication coexist with zones not adapted for packet communication, and the measurement of the surrounding level is started only in the zones adapted for packet communication (step S10). If Ndlvli<Npo, on the other hand, it is determined that the local unit is located at a boundary between an area adapted for packet communication and an area not adapted for packet communication or in an area not adapted for packet communication, and the measurement of the surrounding level for all the perch channels notified in the reported information is continued (step S11).

Figure 8:
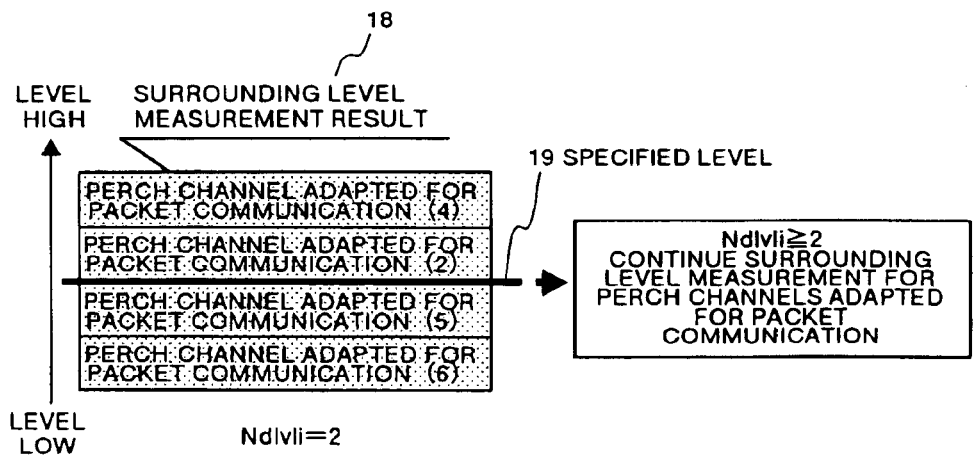
FIG. 8 is a diagram for explaining the surrounding level detection process according to the present embodiment.

FIG. 8 is a diagram for explaining the operation when Ndlvli is equal to or greater than Ndo and when the level measurement method for measuring the surrounding level only of a zone adapted for packet communication is selected in the surrounding level detection process. This figure illustrates a case in which the number Ndlvli of the perch channels adapted for packet communication for which the receiving level of equal to or greater than the specified level 19 is measured is 2 and Ndo is equal to 2.

The mobile unit 5 adapted for packet communication generates the surrounding level measurement result 18 constituting a table in which the result of measurement of the surrounding level is rearranged in the descending order using the surrounding level measurement table. Further, and from the surrounding level measurement result 18, the mobile unit 5 determines the number of Ndlvli of the perch channels adapted for packet communication of a level equal to or greater than the specified level 19. In the case under consideration, because 2(Ndlvli)≧2(Ndo), and therefore it is determined that the local unit is located in an area adapted for packet communication or in an area where zones adapted for packet communication coexist with an area where zones not adapted for packet communication, and the measurement of the surrounding level using the perch channels adapted for packet communication is continued.

As a result, the selective zone transfer to the one adapted for packet communication is made possible and thus the zone transfer chain can be avoided. Further, in an area adapted for packet communication or in an area where zones adapted for packet communication coexist with zones not adapted for packet communication, the number of the perch channels for level measurement can be reduced thereby to suppress the power consumption.

Figure 9:
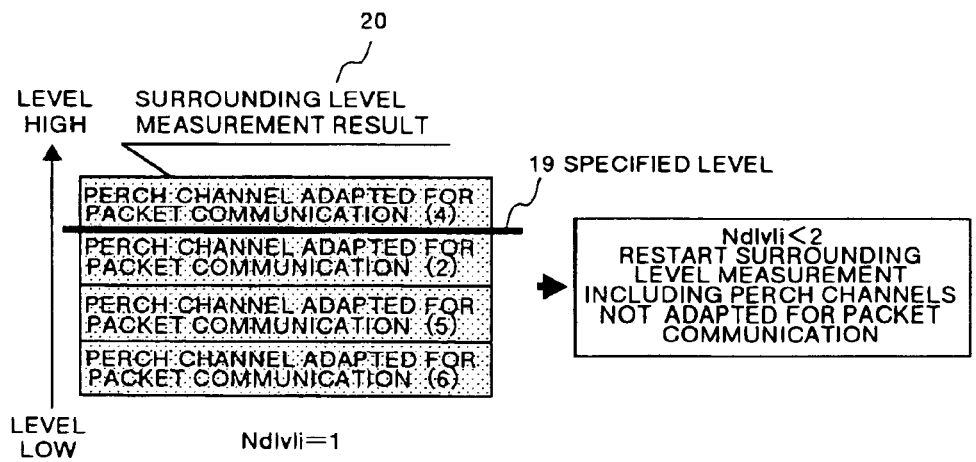
FIG. 9 is an another diagram for explaining the surrounding level detection process according to the present embodiment.

FIG. 9 is a diagram for explaining the operation when Ndlvli is less than Ndo and when the level measurement method for measuring the surrounding level only for a zone adapted for packet communication is selected in the surrounding level detection process. This figure, and illustrates a case in which the number Ndlvli of the perch channels adapted for packet communication for which the receiving level of equal to or greater than the specified level 19 is 1 and Ndo is equal to 2.

The mobile unit 5 adapted for packet communication generates the surrounding level measurement result 20 constituting a table in which the result of measuring the surrounding level is rearranged in the descending order using the surrounding level measurement table, and determines from the surrounding level measurement result 20 the number Ndlvli of the perch channels adapted for packet communication equal to or higher than a specified level 19. In the case under consideration, because 1(Ndlvli)<2(Ndo), it is determined that the local unit is located at a boundary between an area adapted for packet communication and an area not adapted for packet communication or in an area not adapted for packet communication, and the measurement of the surrounding level including the perch channels not adapted for packet communication is started.

As a result, in the boundary between an area adapted for packet communication and an area not adapted for packet communication or in an area not adapted for packet communication, the probability of zone transfer without transferring to the perch channel scan can be increased thereby to suppress the power consumption. Further, the probability of zone transfer by detecting a strong electric field immediately after a zone transfer or at the time of transfer to the voice communication can be reduced. Further, by setting to 1 the arbitrary number Ndo compared with the number of perch channels equal to or higher than a specified level, the method can be expanded to the one in which the surrounding level including the perch channels not adapted for packet communication is measured in the absence of the perch channels adapted for packet communication not lower than the specified level.

Figure 10:
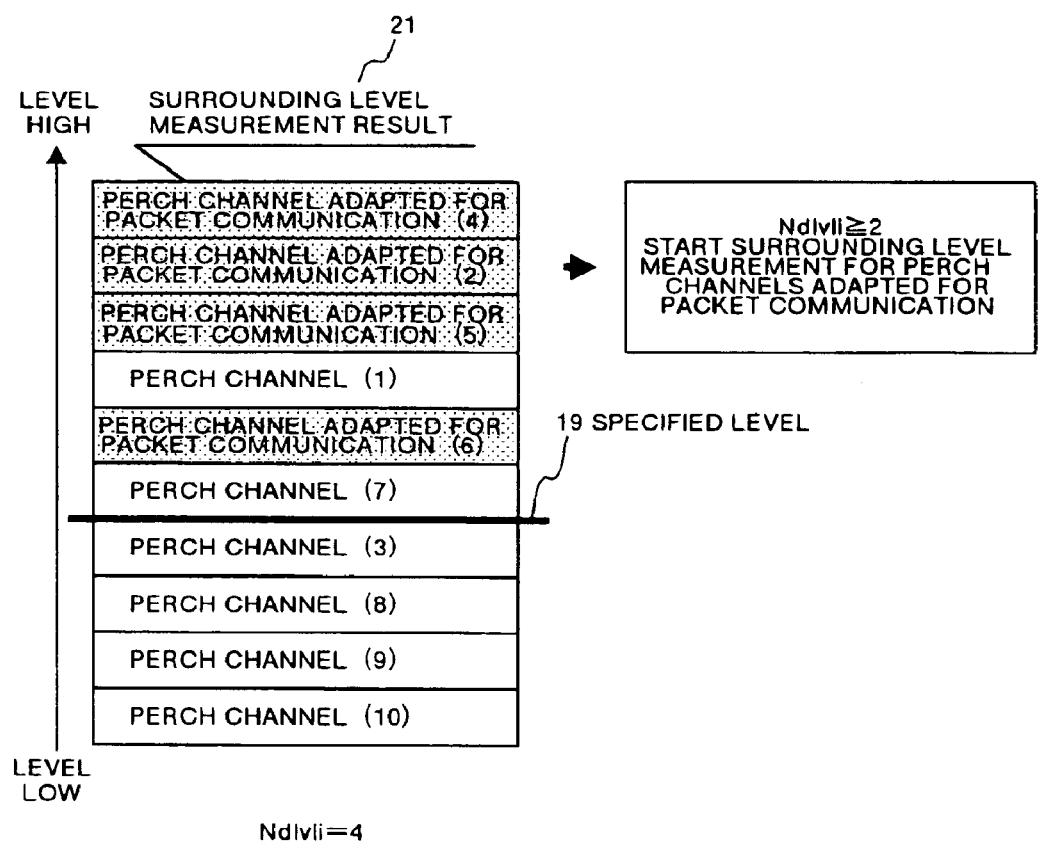
FIG. 10 is a still another diagram for explaining the surrounding level detection process according to the present embodiment.

FIG. 10 is a diagram for explaining the operation when Ndlvli equal to or greater than Npo and when the level measurement method for measuring the surrounding level is selected for all the perch channels notified in the reported information as the surrounding level detection process. This figure illustrates a case in which the number Ndlvli of the perch channels adapted for packet communication for which the receiving level of equal to or greater than a specified level 19 is 4 and Npo is equal to 2.

The mobile unit 5 adapted for packet communication generates the surrounding level measurement result 21 constituting a table in which the result of measuring the surrounding level is rearranged in the descending order using the surrounding level measurement table, and determines from the surrounding level measurement result 21 the number Ndlvli of the perch channels adapted for packet communication having a level equal to or greater than the specified level 19. In the case under consideration, because 4(Ndlvli)≧2(Npo), it is determined that the local unit is located in an area adapted for packet communication or in an area where zones adapted for packet communication coexist with zones not adapted for packet communication, and the measurement of the surrounding level is started using only the perch channels adapted for packet communication.

As a result, the selective zone transfer to a zone adapted for packet communication is made possible thereby to avoid the zone transfer chain. Further, in an area adapted for packet communication or in an area where zones adapted for packet communication coexist with zones not adapted for packet communication, the number of perch channels for level measurement is reduced thereby to suppress the power consumption. Further, the arbitrary number Npo compared with the number of perch channels of equal to or greater than a specified level is set to 1, and in this way the method can be expanded to such an extent that in the presence of a perch channel adapted for packet communication of equal to or greater than the specified level, the surrounding level is measured only for the perch channels adapted for packet communication.

Figure 11:
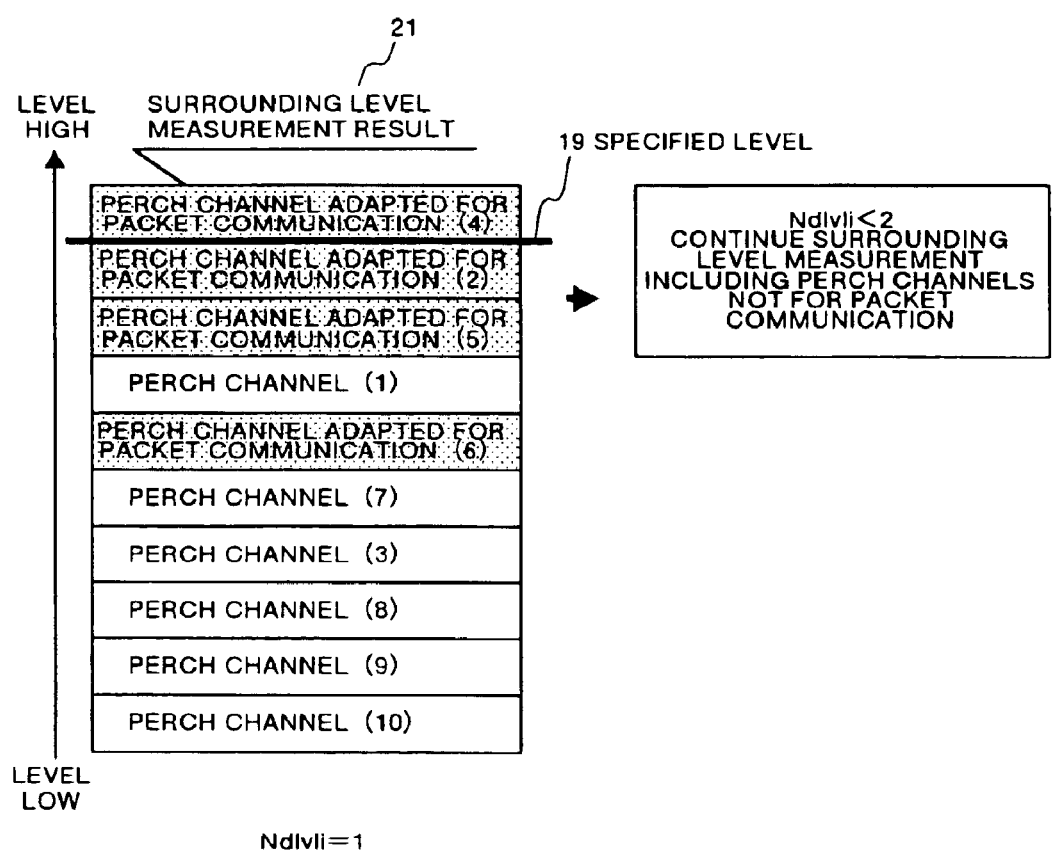
FIG. 11 is a still another diagram for explaining the surrounding level detection process according to the present embodiment.
Figure 14:
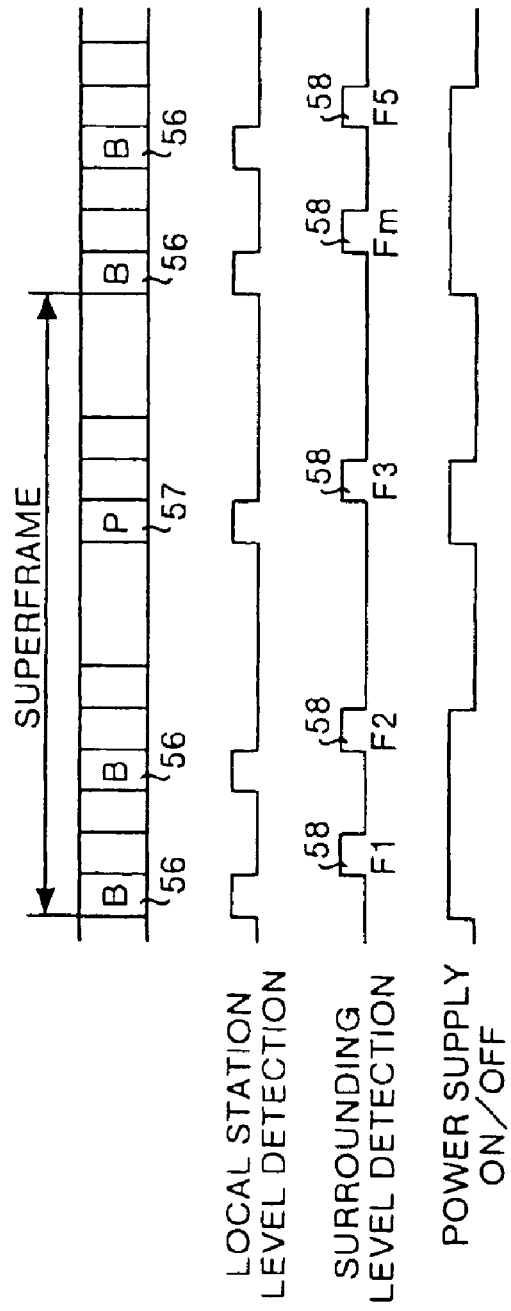
FIG. 14 is a diagram for explaining the surrounding level measurement of the conventional mobile unit.
Figure 15:
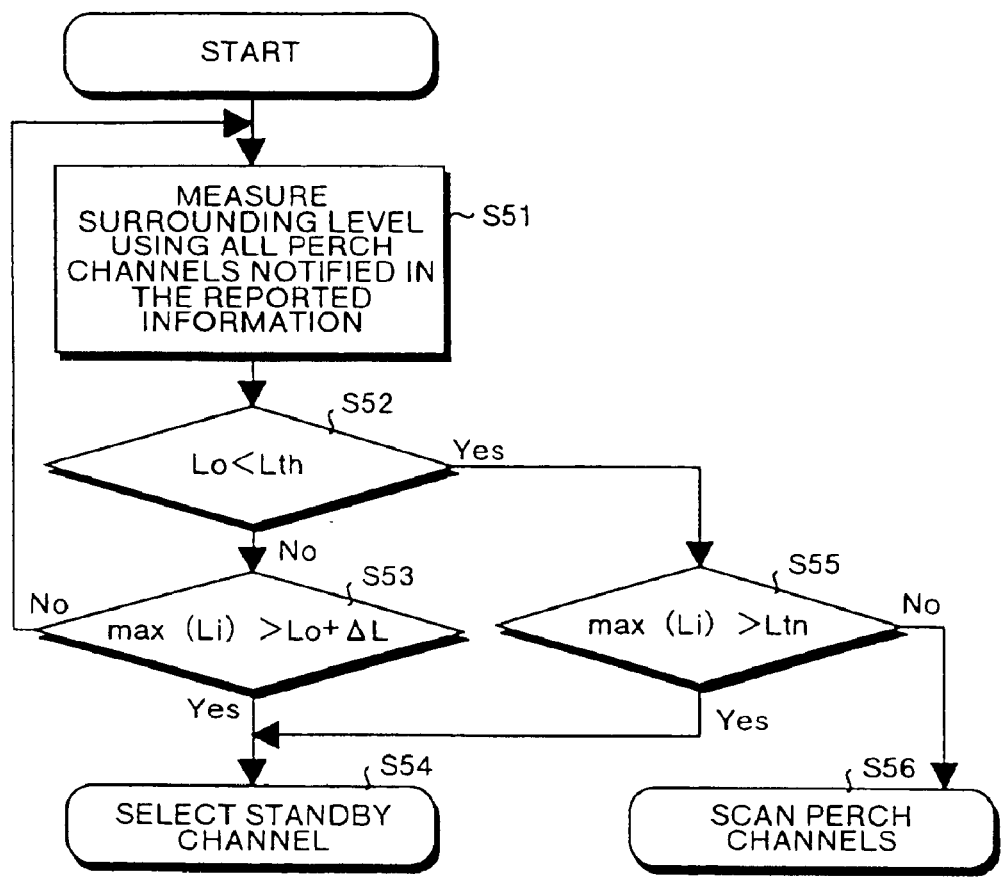
FIG. 15 is a flowchart showing the sequence of the zone transfer operation of the conventional mobile unit.

FIG. 11 is a diagram for explaining the operation when Ndlvli less than Ndo and when the level measurement method is selected for measuring the surrounding level for all the perch channels notified in the reported information in the surrounding level detection process. This figure illustrates a case in which the number Ndlvli of the perch channels adapted for packet communication for which the receiving level of equal to or greater than the specified level 19 is measured is 1, and Npo is equal to 2.

The mobile unit 5 for packet communication generates a surrounding level measurement result 22 constituting a table in which the result of measuring the surrounding level is rearranged in the descending order using the surrounding level measurement table. From the surrounding level measurement result 22, the mobile unit 5 determines the number Ndlvli of the perch channels adapted for packet communication equal to or greater than the specified level 19. In the case under consideration, because 1(Ndlvli)<2(Npo), it is determined that the local unit is located on a boundary between an area adapted for packet communication and an area not adapted for packet communication or in an area not adapted for packet communication, and the measurement of the surrounding level including the perch channels not adapted for packet communication is continued.

As a result, in the boundary between an area adapted for packet communication and an area not adapted for packet communication and in an area not adapted for packet communication, the probability of zone transfer without transferring to the perch channel scan can be increased thereby to suppress the power consumption. Further, the probability of zone transfer by detecting a strong electric field immediately after a zone transfer or at the time of transfer to the voice communication can be reduced.

As described above, according to this embodiment, in the case where the perch channels adapted for packet communication in a number equal to or greater than a predetermined number are included in the reported information notified in the current zone, or in the case where at least a predetermined number of the perch channels adapted for packet communication of equal to or greater than a specified level exist in the surrounding, the surrounding level is measured only for the zones adapted for packet communication and the zone is transferred selectively to the one adapted for packet communication. Thus, the zone transfer chain can be avoided and the number of surrounding perch channels for level measurement can be reduced for a smaller power consumption.

Furthermore, in the case where the number of perch channels adapted for packet communication included in the reported information notified in the current zone is equal to or greater than a predetermined number or in the case where the number of perch channels adapted for packet communication with a level which is equal to or greater than a specified level in the surrounding zones is equal to or greater than a predetermined number, the surrounding level is measured for all the perch channels notified in the reported information. Since the zone is transferred to the one of highest receiving level regardless of whether it is adapted for packet communication or not, the probability of zone transfer without transfer to the perch channel scan can be increased. Further, the probability of transferring to a zone by detecting the strong electric field immediately after zone transfer or during the transfer to the voice communication can be reduced. As a result, the wasteful zone transfer is eliminated, and the wasteful use of a communication band can be reduced.

The preset numbers, the predetermined values and the like can be set using a setting unit which is not shown in the FIG. 1. Further, the control unit 4 has a memory that stores the preset numbers, the predetermined values and the like.

As described above, according to the present invention, the mobile unit monitors only the zones adapted for packet communication which provide a packet communication service in standby mode while omitting the monitoring of the zones not adapted for packet communication where the packet communication service is not available. As a result, the number of the surrounding perch channels for level measurement can be reduced in an area where zones adapted for packet communication coexist with zones not adapted for packet communication or in an area where there are multiplicity of zones adapted for packet communication, while at the same time avoiding the zone transfer chain. Thus, the power consumption can be reduced and so is the wasteful use of the communication bands.

Further, the measurement unit measures the surrounding level, and the control unit controls the measurement unit and eliminates the measurement of the level of the surrounding zones not adapted for packet communication based on the result of measurement by the measurement unit. As a result, in the area where zones adapted for packet communication coexist with zones not adapted for packet communication or where there are multiplicity of zones adapted for packet communication, the number of the surrounding perch channels for level measurement can be reduced, while at the same time avoiding the zone transfer chain. Thus, the power consumption can be saved, while at the same time reducing the wasteful use of communication bands.

Further, in the case where the number of the surrounding zones adapted for packet communication larger than a specified level is larger than a preset number, the control unit controls the measurement unit and eliminates the level measurement of the surrounding zones not adapted for packet communication while measuring the surrounding level of only the zones adapted for packet communication. As a result, in the case where the number of the surrounding zones adapted for packet communication equal to or greater than a specified level is equal to or greater than an arbitrary predetermined value, the number of surrounding perch channels for level measurement can be reduced in the area where there coexist zones adapted for packet communication and zones not adapted for packet communication or where there are a multiplicity of zones adapted for packet communication, while at the same time avoiding the zone transfer chain. Thus, the power consumption can be saved, while at the same time reducing the wasteful use of communication bands.

Further, in the case where the number of surrounding zones adapted for packet communication equal to or greater than a specified level is smaller than a preset number, the control unit controls the measurement unit to measure the surrounding level including the zones not adapted for packet communication, so that the number of surrounding zones selectable at the time of zone transfer is increased and the transfer unit transfers the mobile unit to the surrounding zone highest in level among the zones monitored. As a result, in the case where the number of surrounding zones adapted for packet communication equal to or greater than a specified level is smaller than an arbitrary predetermined number, the zone transfer during the voice communication due to the transmission and receiving of the voice is reduced. Thus, the wasteful use of communication bands can be reduced.

Further, the measurement unit measures the surrounding level, the acquisition unit acquires the reported information, and the control unit controls the measurement unit to eliminate the measurement of the level of the surrounding zones not adapted for packet communication based on the reported information acquired by the acquisition unit. As a result, the number of surrounding perch channels for level measurement can be reduced in the area where there coexist zones adapted for packet communication and zones not adapted for packet communication or where there are a multiplicity of zones adapted for packet communication, while at the same time avoiding the zone transfer chain. Thus, the power consumption can be saved, while at the same time reducing the wasteful use of communication bands.

Further, in the case where the number of the surrounding zones adapted for packet communication notified in the reported information is larger than a preset number, the control unit controls the measurement unit in such a manner as to omit the measurement of the level of the surrounding zones not adapted for packet communication but measure only the surrounding level of the zones adapted for packet communication. As a result, in the case where the number of surrounding zones adapted for packet communication notified in the reported information is equal to or greater than an arbitrary predetermined number, the number of surrounding perch channels for level measurement can be reduced in the area where there coexist zones adapted for packet communication and zones not adapted for packet communication or where there are a multiplicity of zones adapted for packet communication, while at the same time avoiding the zone transfer chain. Thus, the power consumption can be saved, while at the same time reducing the wasteful use of communication bands.

Further, in the case where the number of the perch channels adapted for packet communication notified in the reported information is smaller than a preset number, the control unit controls the measurement unit to measure the surrounding level including the zones not adapted for packet communication and increases the number of surrounding zones selectable at the time of zone transfer, and the transfer unit transfers the zone to the surrounding one highest in level among those monitored. As a result, in the case where the number of perch channels adapted for packet communication notified in the reported information is smaller than an arbitrary predetermined number, the zone transfer during the voice communication due to the voice transmission and receiving is reduced. Thus, the wasteful use of communication bands can be reduced.

Further, only the zones adapted for packet communication where the packet communication service is available are monitored in standby mode while the zones not adapted for packet communication where the packet communication service is not offered are not monitored. As a result, in the area where zones adapted for packet communication coexist with zones not adapted for packet communication and the area where a multiplicity of zones adapted for packet communication exist, the number of perch channels for level measurement can be reduced while at the same time avoiding the zone transfer chain. Thus, the power consumption can be saved, while at the same time reducing the wasteful use of communication bands.

Further, the surrounding level is measured, and based on the result of measurement, the measurement of the level of the surrounding zones not adapted for packet communication is omitted. As a result, in the area where zones adapted for packet communication coexist with zones not adapted for packet communication and the area where a multiplicity of zones adapted for packet communication exist, the number of perch channels for level measurement can be reduced while at the same time avoiding the zone transfer chain. Thus, the power consumption can be saved, while at the same time reducing the wasteful use of communication bands.

Further, in the case where the number of surrounding zones adapted for packet communication equal to or greater than a specified level is larger than a preset number, the measurement of the level of the surrounding zones not adapted for packet communication is omitted, and the level of only the surrounding zones adapted for packet communication is measured. As a result, in the case where the number of surrounding zones adapted for packet communication equal to or greater than the specified level is equal to or greater than an arbitrary predetermined number, the number of perch channels for level measurement can be reduced in the area where zones adapted for packet communication coexist with zones not adapted for packet communication and the area where a multiplicity of zones adapted for packet communication exist, while at the same time avoiding the zone transfer chain. Thus, the power consumption can be saved, while at the same time reducing the wasteful use of communication bands.

Further, in the case where the number of surrounding zones adapted for packet communication equal to or greater than a specified level is smaller than a preset number, the surrounding level including zones not adapted for packet communication is measured, and the zone is transferred to the one of highest level among those monitored. As a result, in the case where the number of surrounding zones adapted for packet communication equal to or greater than the specified level is smaller than an arbitrary predetermined number, the zone transfer during the voice communication due to the voice transmission or receiving is reduced. Thus, the wasteful use of communication bands can be reduced.

Further, the surrounding level is measured, the reported information is acquired and the measurement of the level of the surrounding zones not adapted for packet communication is omitted based on the acquired reported information. As a result, the number of surrounding perch channels for level measurement can be reduced in the area where zones adapted for packet communication coexist with zones not adapted for packet communication and the area where a multiplicity of zones adapted for packet communication exist, while at the same time avoiding the zone transfer chain. Thus, the power consumption can be saved, while at the same time reducing the wasteful use of communication bands.

Further, in the case where the number of surrounding zones adapted for packet communication notified in the reported information is larger than a preset number, the level measurement of the surrounding zones not adapted for packet communication is omitted, and the surrounding level of only the zones adapted for packet communication is measured. As a result, in the case where the number of surrounding zones adapted for packet communication notified in the reported information is equal to or greater than an arbitrary predetermined number, the number of surrounding perch channels for level measurement can be reduced in the area where zones adapted for packet communication coexist with zones not adapted for packet communication and the area where a multiplicity of zones adapted for packet communication exist, while at the same time avoiding the zone transfer chain. Thus, the power consumption can be saved, while at the same time reducing the wasteful use of communication bands.

Further, in the case where the number of perch channels adapted for packet communication notified in the reported information is smaller than a preset number, the surrounding level including the zones not adapted for packet communication is measured, and the zone is transferred to the one highest in level among those monitored. As a result, in the case where the number of the perch channels adapted for packet communication notified in the reported information is smaller than an arbitrary predetermined number, the zone transfer during the voice communication due to the transmission or receiving of the voice is reduced. Thus, the wasteful use of communication bands can be reduced.

According to the recording medium of the present invention, the aforementioned method according to the present invention can be efficiently executed by the computer. Thus, the power consumption can be saved, while at the same time reducing the wasteful use of communication bands.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mobile unit adapted for packet communication, which mobile unit is used in mobile communication and monitors the surrounding zones in standby mode, said mobile unit comprising:
   a monitor unit which monitors only the zones that are adapted for packet communication.

2. A mobile unit adapted for packet communication, said mobile unit comprising:
   a measurement unit which measures a surrounding level and obtains a measurement result; and
   a control unit which controls said measurement unit, based on the measurement result of said measurement unit, so as to eliminate the measurement of the surrounding level for the zones that are not adapted for packet communication.

3. The mobile unit adapted for packet communication according to claim 2, wherein if the result of measurement by said measurement unit shows that the number of the surrounding zones that are adapted for packet communication having a level that is equal to or greater than a specified level is larger than a preset number, said control unit controls said measurement unit so as to eliminate the measurement of the surrounding zones that are not adapted for packet communication thereby measuring the surrounding level of only the zones that are adapted for packet communication.

4. The mobile unit adapted for packet communication according to claim 2, further comprising a zone transfer unit which transfers to a surrounding zone of the highest level among the zones monitored, wherein if the result of measurement by said measurement unit shows that the number of the surrounding zones that are adapted for packet communication having a level that is equal to or greater than a specified level is smaller than a preset number, said control unit controls said measurement unit so as to measure the level of the surrounding zones including the zones that are not adapted for packet communication.

5. The mobile unit adapted for packet communication according to claim 3, further comprising a setting unit for setting a preset number.

6. A mobile unit adapted for packet communication, said mobile unit comprising:

a measurement unit which measures a surrounding level;
   an acquisition unit which acquires a reported information; and
   a control unit which controls said measurement unit, based on the reported information acquired by said acquisition unit, so as to eliminate the measurement of the surrounding level for the zones that are not adapted for packet communication.

7. The mobile unit adapted for packet communication, said mobile unit comprising:

a measurement unit which measures a surrounding level;
   an acquisition unit which acquires a reported information; and
   a control unit which controls said measurement unit, based on the reported information acquired by said acquisition unit, so as to eliminate the measurement of the surrounding level for the zones that are not adapted for packet communication;
   wherein if a number of perch channels that are adapted for packet communication notified in the reported information is larger than a preset number, said control unit controls said measurement unit so as to eliminate the measurement of the surrounding zones that are not adapted for packet communication thereby measuring the surrounding level of only the zones that are adapted for packet communication.

8. The mobile unit adapted for packet communication, said mobile unit comprising:

a measurement unit which measures a surrounding level;
   an acquisition unit which acquires a reported information; and
   a control unit which controls said measurement unit, based on the reported information acquired by said acquisition unit, so as to eliminate the measurement of the surrounding level for the zones that are not adapted for packet communication;
   a zone transfer unit which transfers to a surrounding zone highest in level among the zones monitored,
   wherein if a number of the perch channels that are adapted for packet communication notified in the reported information is smaller than a preset number, said control unit controls said measurement unit so as to measure the level of the surrounding zones including the zones that are not adapted for packet communication.

9. The mobile unit adapted for packet communication according to claim 7, further comprising a setting unit for setting the preset number.

10. A zone transfer method used for mobile communication in which the surrounding zones are monitored while standing by, the method comprising a step of:

monitoring only the zones that are adapted for packet communication.

11. A zone transfer method comprising the steps of:

measuring a surrounding level and obtaining a result based on the measurement; and
   selecting whether the measurement of the surrounding zones that are not adapted for packet communication is to be eliminated based on the result of measurement in the measurement step.

12. The zone transfer method according to claim 11, wherein if the result of measurement in the measurement step shows that the number of the surrounding zones that are adapted for packet communication having a level that is equal to or greater than a specified level is larger than a preset number, then in the selection step a selection is made so as to eliminate the measurement of the level of the surrounding zones that are not adapted for packet communication thereby measuring only the level of the surrounding zones that are adapted for packet communication.

13. The zone transfer method according to claim 11, further comprising a step of transferring to a surrounding zone highest in level among the zones monitored, wherein if the result of measurement in the measurement step shows that the number of the surrounding zones that are adapted for packet communication having a level that is equal to or greater than a specified level is smaller than a preset number, then in the selection step a selection is made so as to measure the level of the surrounding zones including the zones that are not adapted for packet communication.

14. The zone transfer method according to claim 12, further comprising a step of setting the preset number.

15. A zone transfer method comprising the steps of:

measuring a surrounding level;
   acquiring a reported information; and
   selecting whether the measurement of the surrounding zones that are not adapted for packet communication is to be eliminated based on the reported information acquired in the acquisition step.

16. The zone transfer method comprising the steps of:

measuring a surrounding level;
   acquiring a reported information; and
   selecting whether the measurement of the surrounding zones that are not adapted for packet communication is to be eliminated based on the reported information acquired in the acquisition step;
   wherein if a number of the perch channels that are adapted for packet communication notified in the reported information is larger than a preset number, then in the selection step a selection is made so as to eliminate the measurement of the level of the surrounding zones that are not adapted for packet communication thereby measuring only the level of the surrounding zones that are adapted for packet communication.

17. The zone transfer method comprising the steps of:

measuring a surrounding level;
   acquiring a reported information;
   selecting whether the measurement of the surrounding zones that are not adapted for packet communication is to be eliminated based on the reported information acquired in the acquisition step; and
   transferring to a surrounding zone highest in level among the zones monitored,
   wherein if a number of the perch channels that are adapted for packet communication notified in the reported information is smaller than a preset number, then in the selection step a selection is made so as to measure the level of the surrounding zones including the zones that are not adapted for packet communication.

18. The zone transfer method according to claim 16, further comprising a step of setting the preset number.

19. A computer readable recording medium characterized by recording a program for the computer to execute a zone transfer method used for mobile communication in which the surrounding zones are monitored while standing by, the method comprising a step of:

monitoring only the surrounding zones that are adapted for packet communication.

20. A computer readable recording medium characterized by recording a program for the computer to execute a zone transfer method comprising the steps of:

measuring a surrounding level and obtaining a result based on the measurement; and selecting whether the measurement of the surrounding zones that are not adapted for packet communication is to be eliminated based on the result of measurement in the measurement step.

21. A computer readable recording medium characterized by recording a program for the computer to execute a zone transfer method comprising the steps of:

measuring a surrounding level;

acquiring a reported information; and selecting whether the measurement of the surrounding zones that are not adapted for packet communication is to be eliminated based on the reported information acquired in the acquisition step.

* * * * *